US007325188B1

(12) United States Patent
Covington et al.

(10) Patent No.: US 7,325,188 B1
(45) Date of Patent: Jan. 29, 2008

(54) METHOD AND SYSTEM FOR DYNAMICALLY CAPTURING HTML ELEMENTS

(75) Inventors: Clinton D. Covington, Kirkland, WA (US); Nilanjan Banerjee, Seattle, WA (US); Jay L. Massena, Bellevue, WA (US); Louisa Lee, Bellevue, WA (US); Robbie A. Paplin, Carnation, WA (US); Sanjay Jacob, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 10/654,658

(22) Filed: Sep. 3, 2003

(51) Int. Cl.
*G06N 3/00* (2006.01)
(52) U.S. Cl. .................... 715/513; 715/500.1
(58) Field of Classification Search ............ 715/500.1, 715/513; 709/219
See application file for complete search history.

(56) References Cited

U.S. PATENT DOCUMENTS 5,870,769 A * 2/1999 Freund .................. 715/501.1
6,021,426 A * 2/2000 Douglis et al. ............. 709/200
6,351,767 B1 * 2/2002 Batchelder et al. ......... 709/219
6,810,414 B1 * 10/2004 Brittain ...................... 709/219
2001/0044810 A1 * 11/2001 Timmons .................... 707/513
2003/0101412 A1 * 5/2003 Eid ............................ 715/513
2004/0019611 A1 * 1/2004 Pearse et al. ............ 707/104.1

* cited by examiner

*Primary Examiner*—Stephen Hong
*Assistant Examiner*—Manglesh Patel
(74) *Attorney, Agent, or Firm*—Merchant & Gould

(57) ABSTRACT

Method and system for dynamically capturing elements from a target Web page and displaying the captured elements in another Web page. A user first opens a Web Capture Web Part dialog box in a browser application program. The user navigates to the target server hosting the target Web page and sends an HTTP request to the target server to retrieve the target Web page. The target server returns the target Web page in an HTML string, which it is displayed in the Web Part Web Capture dialog box. The user then selects the elements that he or she wants to capture. The captured elements are then displayed in a Web part on the user's Web page and the returned HTML string is stored in a cache memory. Each subsequent time the captured elements are displayed, the elements are automatically updated from the target Web page.

23 Claims, 14 Drawing Sheets

METHOD AND SYSTEM FOR DYNAMICALLY CAPTURING HTML ELEMENTS

TECHNICAL FIELD

The present invention is directed to capturing hypertext markup language (HTML) elements from a target Web page, and more particularly to dynamically capturing elements from a target Web page.

BACKGROUND OF THE INVENTION

Since the introduction of Internet browser application programs with Graphical User Interfaces (GUI), Web page designers have been looking for ways to liven up their Web page designs while providing current and reliable information. To make their Web pages more appealing, Web page designers and users started adding preformatted objects, such as clip art, to their Web pages. For example, many Web page designers began using clip art objects as icons, or in the title of the Web pages. Although the clip art objects added to the visual appeal of the Web pages, they provided very little, if any, information to users.

As graphical Web page development improved, Web page designers began to expand the types of objects they incorporated into their Web pages. Designers started adding animated clip art, photographs, video files, and audio files to their Web pages. For example, Web page designers of news Web sites began adding video clips of news reports to their Web pages. Visitors to the news Web sites could select a video clip and view the news report in a pop-up window in the browser application program. The designers typically uploaded these files manually onto the server hosting their Web page, which was a time consuming and expensive process. As a result, these files were frequently outdated by the time the new files were uploaded onto the servers.

One method used to reduce the work of uploading objects on servers is known as HTML capture, or Web capture. Web capture allows web designers to retrieve information easily from another Web site and display it on their Web pages. However, Web capture methods are limited to "static" captures. That is, the captured element cannot be updated without the user performing the entire Web capture operation. For example, suppose a user wants to display the current quotes for several stocks, such as International Business Machines (IBM), Microsoft Corporation, and Apple, Inc. on his or her own Web page. The user individually selects the quotes for each company from an electronic ticker on a target Web page and uses Copy and Paste commands to display the quotes from IBM, Microsoft, and Apple in a table on his Web page. However, because the user "cut and pasted" the stock quotes into his Web page, the content behind the quotes is static. That is to say, it will never change as the stock quotes change on the target Web page. If the user wanted to update, or refresh the stock quotes, the user would have to perform the same Web capture routine for each individual stock all over again. Unfortunately, this method of cutting and pasting elements from a target Web page into the user's Web page is inefficient and time consuming. Furthermore, because the user must manually select, copy, and paste the desired elements into his or her Web page, this method can lead to errors being introduced, especially if the underlying data on the target page has changed or has been moved to a different location on the target Web page. The user may accidentally select the wrong element, and thereby introduce errors into his or her Web page.

One method to alleviate the necessity for repeatedly cutting and pasting objects from the target Web page is using Web Queries to place HTML objects into spreadsheet application programs. Web Queries offer users a predictable way of importing table data into a spreadsheet application program from any source on the Worldwide Web. The user points the Web Query at an HTML document on either a Web server or a file server and imports either part or all of the content of the HTML document into the spreadsheet application program. To initiate a Web Query, a user may select the Web Query option from a menu, which opens a Web Query dialog box. The user inputs the URL of the desired Web page in an address bar associated with the Web Query dialog box, and the Web page is then displayed in a display area of the Web Query dialog box. The user then selects either the entire Web page, or a combination of tables within the Web page to download to the spreadsheet application program. Typically, the user has the option of importing the tables into the spreadsheet application in one of several formats. For instance, the user may elect to import the table data in plain text format, rich text format, or HTML text format.

Although Web Queries have mitigated the necessity for repeatedly cutting and pasting objects from the target Web page into a spreadsheet application, Web Queries have several drawbacks. First, Web Queries are limited in the type of data that is allowed to be imported from the target Web page. Because Web Queries are used only with spreadsheet application programs, only table objects may be imported from a target Web page. Users are not allowed to import graphical objects, such as picture files and video files, audio files, or the like using Web Queries. Moreover, since only table objects may be imported, only the underlying content, i.e., the numerical data is imported into the spreadsheet application program. All other content associated with the data, such as the formatting, cell dimensions, etc. are not rendered by the Web Queries.

This is not to say that users have no control over how the tabular data is imported. Users may select whether the table object should be imported as plain text, rich text, or full HTML text. However, it is typically recommended users import the table objects using either the plain text, or rich text formats. This is due to the fact that the full HTML formatting option may be disruptive to spreadsheet application program since the Web Query applies merged cells in the spreadsheet application program to represent commonly used nested tables in HTML. Another drawback to Web Queries is that if the table object contains data that is linked back to a reference Web site, the Web Query will not preserve the link. For example, if a user creates a Web Query that contains critical stock quotes, in which each stock quote contains a link back to a "reference" Web page that contains the detailed information about that particular stock. The Web Query will maintain the link back to the target Web page so that the quote for the particular stock can be updated. However, the Web Query will not preserve any links back to the reference Web page. This is due to the fact that the link back to the reference Web page is a "relative" URL, that is it based upon the file path of the current document containing the stock quote. When Web Query renders the particular stock quote in the spreadsheet application program, the file path of the current document containing the stock quote is altered to the location of the spreadsheet application program, thereby rendering the URL of the reference Web page inoperable.

Therefore, there is a need for a more efficient method for capturing elements from Web pages and displaying the captured elements in another application program. In particular, there is a need for a more efficient method for dynamically linking the captured elements to the target Web page to provide a simple and effective method for updating, or refreshing, the captured element within a browser application program.

SUMMARY OF THE INVENTION

The present invention meets the needs described above in a method for dynamically capturing elements from a target Web page. Generally described, the present invention includes a method to allow a user to capture elements from a target Web page and dynamically display the captured element in a Web part in the user's own Web page. The user first opens a Web Capture Web Part dialog box from an application program running on a client platform. The user navigates to the target server through the Web Capture Web Part dialog box and sends an HTTP call to the target server. The target server responds by returning the target Web page in an HTML string where it is displayed in the Web Capture Web Part dialog box. An icon is then placed proximate to each element in the Web page, which is used to allow the user to select individual elements for capture. The user then selects the elements on the target Web page that he or she wants to capture by clicking on the icons proximate to the elements. The elements are then dynamically displayed in a Web part on the user's Web page.

More particularly described, the properties associated with the selected elements are stored in a memory location for subsequent updates. The associated properties may include the Uniform Resource Locator (URL) of the target web page, the element tags and the Document Object Module (DOM) indexes or element IDs associated with the captured element. In addition, a time and date stamp of the time the elements were captured, and a refresh rate may be stored as properties associated with the selected elements. The refresh rate represents how much time should pass before the elements are refreshed from the target Web page. Whenever the captured elements are subsequently displayed in a Web part, the sum of the time and date stamp and the refresh rate are compared to the current time of the processing unit. If the sum of the time and date stamp and the refresh rate is less than the current time, then the current HTML string of the captured elements stored in the cache memory is rendered in the Web Part without being refreshed. If however, the sum of the time and date stamp and the refresh rate is greater than the current time from the processor unit, the captured elements are updated from the target Web page. The properties associated with the captured elements are used to call the updated elements from the target Web page. Once the updated elements are loaded into the Web part, the properties associated with the updated elements are stored in a memory location and the updated HTML string is stored in the cache memory location.

The present invention also provides a graphical interface for capturing elements from the target Web page and placing them in another Web page. The interface is provided by a dialog box that is displayed by the user's browser program. The dialog box allows the user to navigate to the target server and display the target Web page in a viewing area of the dialog box. An icon is displayed proximate to each element to provide the user with a visual cue, as to which elements may be captured. The user may select one or more elements to capture by clicking on the icons associated with the elements.

The present invention further provides a system for capturing elements from a target Web page. The system includes a client platform, which contains the user's browser application program and a server platform. Alternatively, the system may only comprise a client platform. The capture routine for capturing elements from the target Web page, resides partially on the client platform and partially on the server platform. This allows the capture to be performed from either the client platform, or the server platform. If the capture is performed from the client platform, the HTML string containing the captured elements from target Web page is downloaded to the client platform, which sends the HTML string to the server platform. The HTML string is processed at the server platform to remove unnecessary script and insure that the elements can be captured. After processing the captured element, the server platform returns the HTML string to the client platform, where the captured elements are rendered inside a Web part within the browser application program. In addition, the HTML string containing the captured elements are stored in a cache memory at the client platform.

Alternatively, there may be instances when it may be necessary to perform both the fetching and processing operations at the server platform. In these instances, the server platform will initiate the call to the target Web page and receive the returned HTML string. The returned HTML string is then processed at the server platform. Next, the HTML string is downloaded to the client platform, where the captured elements are rendered in a Web part. The properties associated with the captured elements are updated and the HTML string is stored in a memory device on the server platform.

The various aspects of the present invention may be more clearly understood and appreciated from a review of the following detailed description of the disclosed embodiments and by reference to the appended drawings and claims.

DETAILED DESCRIPTION OF THE INVENTION

The present invention is directed toward a method and system for allowing a user to dynamically link an element or a region of content captured from a target Web page and display it in another application program, such as the Internet Explorer browser application program, manufactured by Microsoft Corporation of Redmond, Wash.

Figure 1:
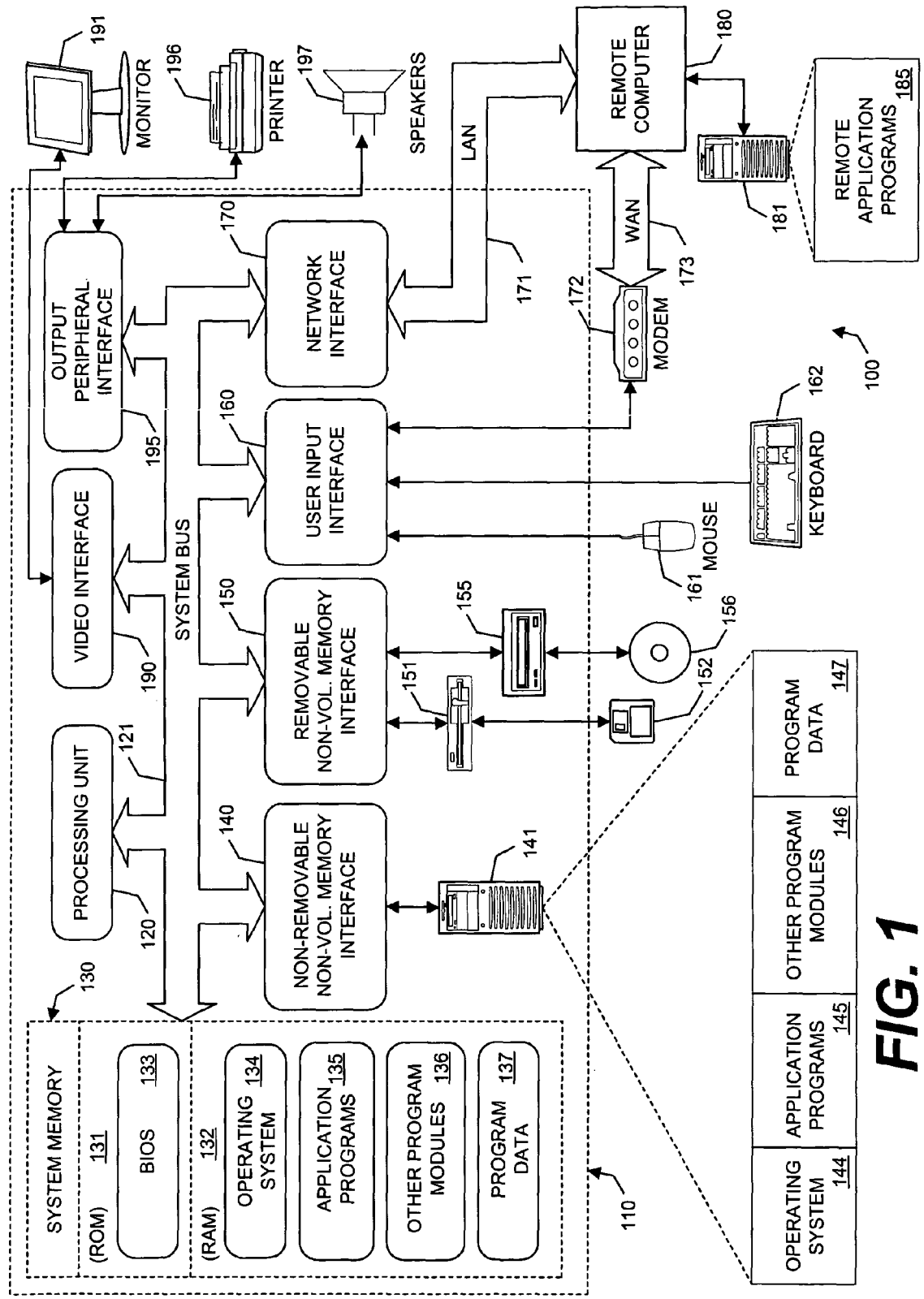
FIG. 1 is a block diagram illustrating a computer that provides the operating environment for the embodiments of the present invention.

Turning now to the figures, in which like numerals refer to like elements through the several figures, FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that performs particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
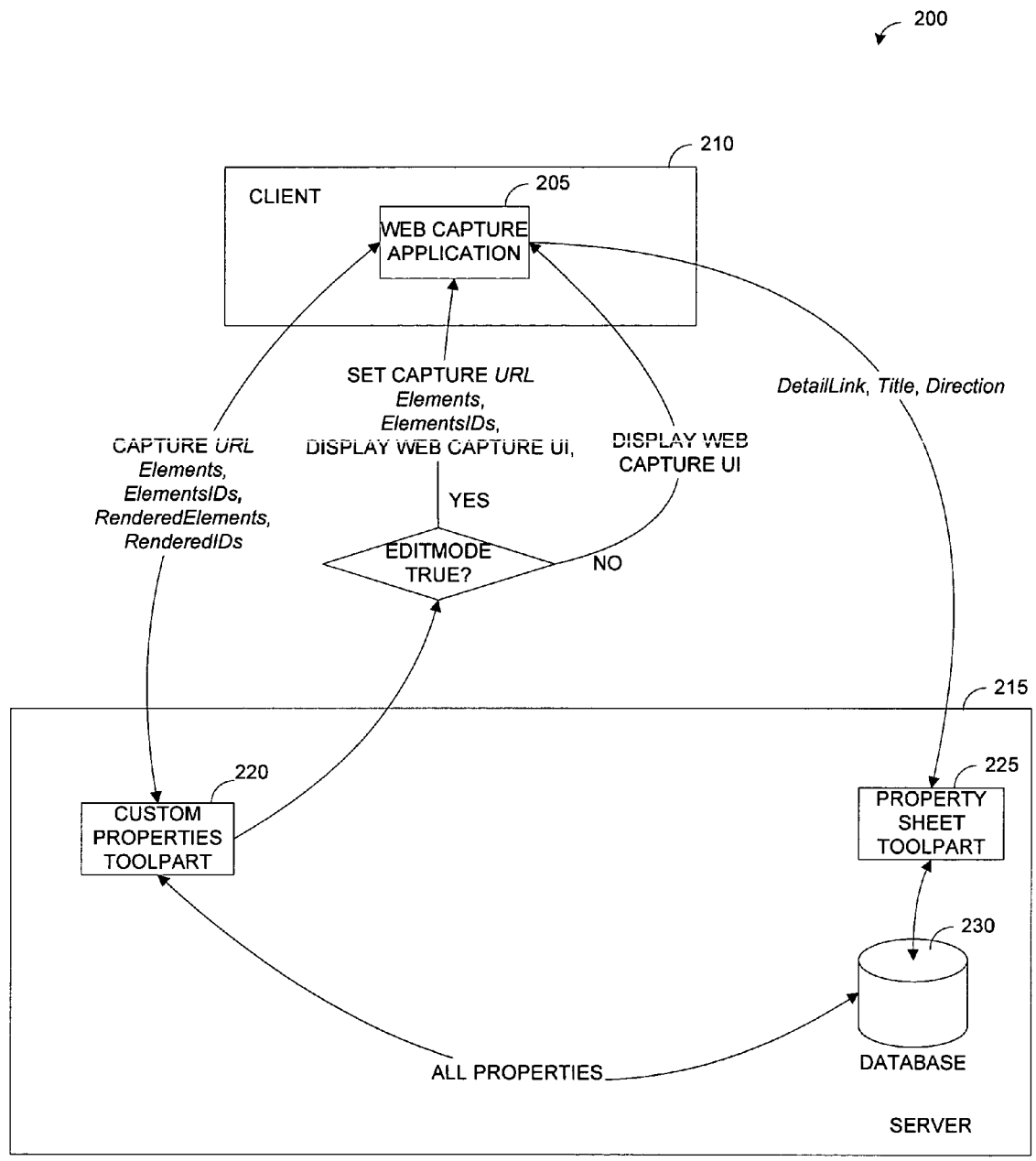
FIG. 2 is block diagram illustrating an integration of present invention in Web portal server application.

FIG. 2 is a block diagram illustrating an environment 200 for integrating the Web Capture application 205. The Web Capture application 205 resides on a client platform 210 and is used to retrieve a target Web page, which contains the elements that a user may want to capture. Once the target Web page has been retrieved, the user selects the appropriate elements to capture. After all the element to be captured have been selected, the Web Capture application 205 extracts several properties associated with the target Web page and each of the captured elements. Specifically, the Web Capture application 205 extracts the URL of the target Web page and the Elements, ElementsID, RenderedElements, and RenderedID properties of the target Web page and stores them in a Custom Property Toolpart 220 on a server platform 215. The Element property stores a mask of the names of the tags associated with every elements on the target Web page, and may take the values TABLE, IMG, PAGE, or Web Part. The ElementID property stores a mask of the element ID or DOM indexes of the tags associated with every element on the target Web page. The Edit Web Capture Toolpart 220 will always try to store the ElementID property first, but most elements do not include IDs. When an ElementID property is not found for a particular element, the Web Capture application 205 stores the Document Object Module (DOM) index associated with the particular element. The mask is an array of element IDs or DOM indexes separated by commas. The RenderedElements and RenderedElementID properties are identical to the Elements and ElementsID properties except that they store a mask of the names of the tags and the element ID or DOM indexes of the tags associated with the elements that are captured and rendered in the Web part, respectively.

Additionally, the Web Capture application 205 also extracts a DetailLink property, a Title property, and a Direction property from the target Web page. The DetailLink property contains the address of the target Web page, the Direction property contains a value that is based on the target Web page that the URL is pointing to, and the Title property contains the title of the target Web page. The Web Capture application 205 then passes these properties to a Property Sheet Tool Part 225 on the server platform 215 where the properties are processed. The Property Sheet Tool Part 225 stores all the properties for the captured elements together under the category heading "Web Capture." The Property Sheet Tool Part 225 then exchanges these properties with the database 230 where they are stored.

When the captured elements are being updated, an EditMode tag will contain the Boolean value "True" to signify that the an existing Web Part is being updated. A Web Capture Web Part is displayed bye the Web Capture application 205 and the Custom Property Tool Part 220 forwards the captured URL, Elements property, and ElementsID property associated with the captured element to the Web Capture application 205 to perform the required update.

Figure 3:
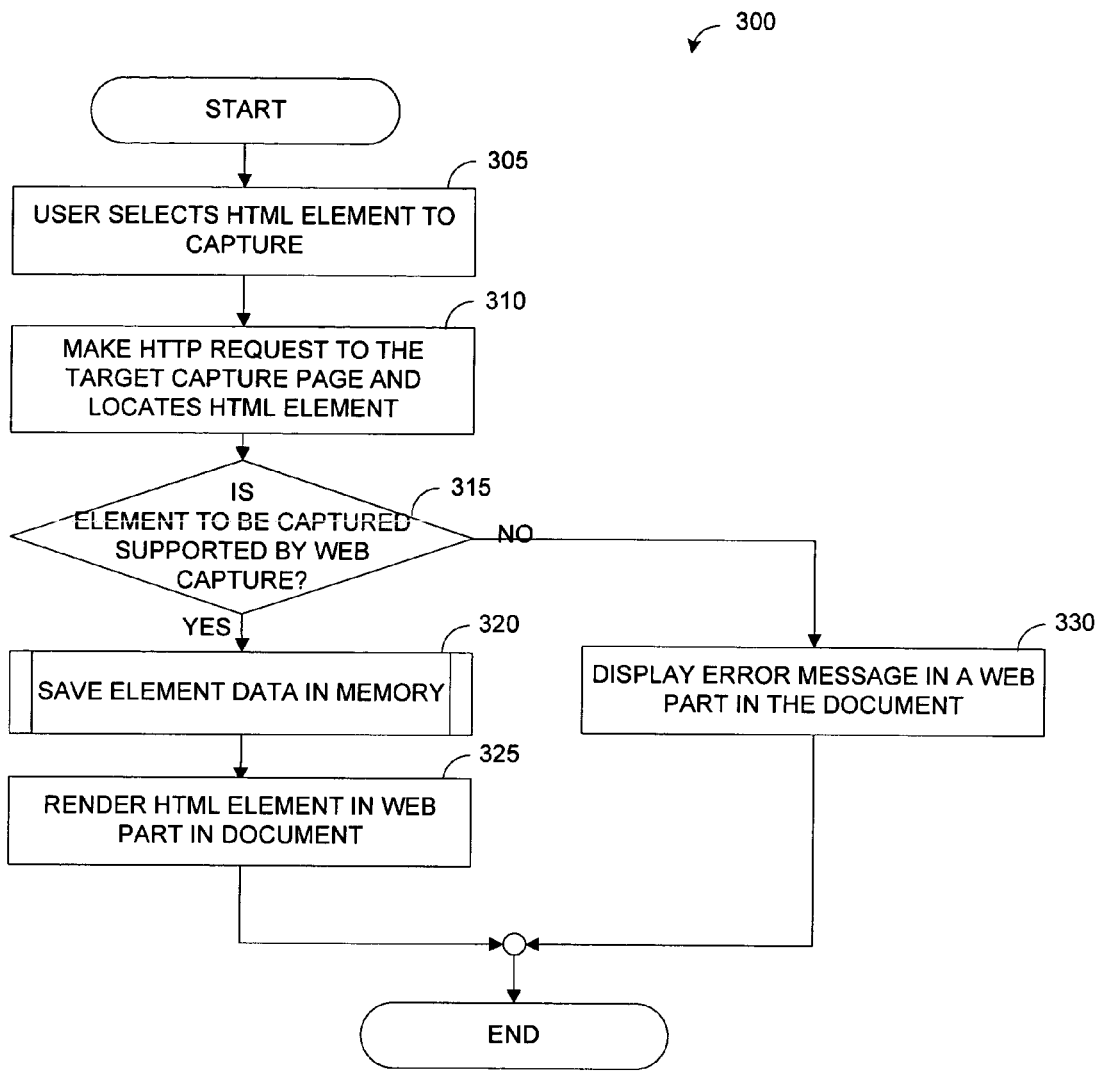
FIG. 3 is logic flow diagram illustrating a general routine for capturing elements from a target Web page and displaying them in a Web part.

FIG. 3 is a logic flow diagram illustrating a general Web Capture routine 300 for capturing elements from a target Web page and dynamically displaying it in a Web part in another application program. For purposes of this discussion the application program in which the captured element is displayed in a Web part is a browser application program, such as the Internet Explorer 6.0 browser application program, available from Microsoft Corporation of Redmond, Wash. However, those skilled in the art will appreciate that other application programs, such as word processing programs, graphical presentation programs, spreadsheet programs, or any other application program may be used to display the HTML object in the Web part without departing from the scope of this invention.

The Web Capture routine 300 begins at 305, in which a user selects an element to capture and place into his or her document, such as a Web page in a browser application program. The selection process begins when the user opens the Web Capture application 205 in the browser application program and navigates to the desired target Web page by manually entering the Uniform Resource Locator (URL) associated with the target Web page in the address bar of the browser application program. Once the user has navigated to the target Web page, the user selects an element, which he or she wants to capture and display in the browser application program. At 310, the Web Capture program 210 makes a HTTP Request to the target Web page to retrieve the desired HTML object. In response to the HTTP Request, the target Web page returns the HTML object in an HTML string.

At 315, the determination is made whether the captured element is supported by the Web Capture routine 300. For example, TABLES, IMG, Web parts, and the entire Web page elements are supported by the Web Capture routine 300. The HTML string is examined to determine whether the META tag identifying the element type contains one of the following values: TABLE, IMG, WebPart, or EntirePage. If the META tag associated with the selected element contains one of the values TABLE, IMG, WebPart, or EntirePage, then "YES" branch is followed to 320, in which the properties associated with the element are stored in a memory location. Specifically, the properties are stored in the Edit Clip Tool Part 220 and the property sheet 225 on the server platform 215. Additionally, the HTML string is stored in a cache memory located on the server platform 215. Finally, at 325 the captured element is rendered in the Web part in the browser application program on the client platform 210. Returning to 315, if the determination is made that the META tag associated with the selected captured element does not contain a value equal to TABLE, IMG, WebPart, or EntirePage, then the "NO" branch is followed to 330 where an error message is displayed in the Web part signaling to the user that the element cannot be displayed.

Figure 4:
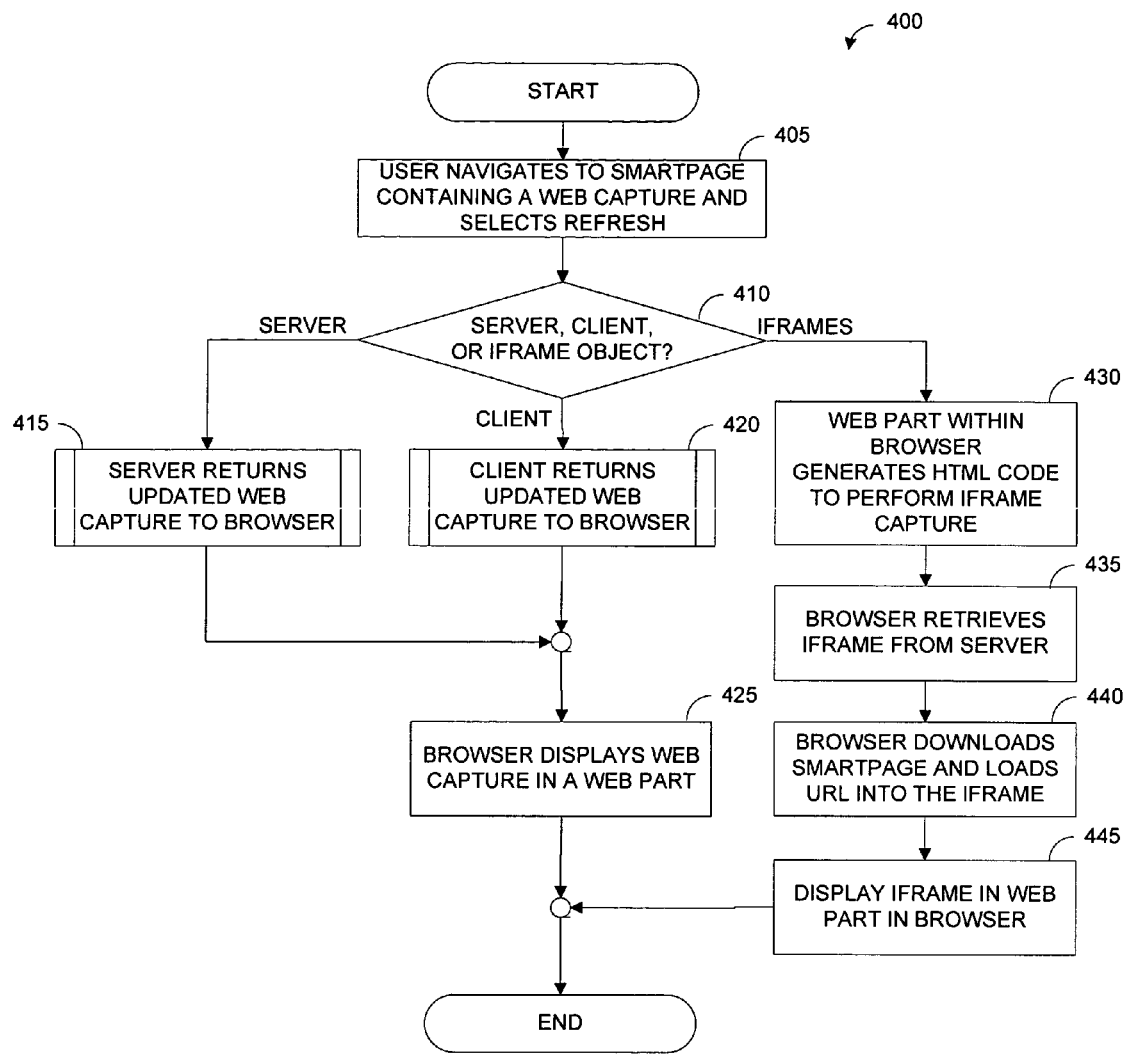
FIG. 4 is a logic flow diagram illustrating a routine for determining whether elements from a target Web page are captured by a client platform, a server platform, or displayed within an IFRAME.

FIG. 4 is a logic flow diagram illustrating routine 400 for capturing an object from the server platform 215. Routine 400 begins at 405 when the user navigates to a Web Part page from his or her browser that contains a Web part and decides to "refresh" the Web part. At 410, the Web part calls the Web Capture application 205 on the server platform 215, which examines the properties of the Web part. Specifically, the Web Capture application 205 on the server platform 215 examines a property called CaptureMethod, associated with the Web Part to determine whether the fetch operation to retrieve the Web page is to be performed by the server platform 215, the client platform 210, or whether the captured element is rendered in an IFRAME. If the CaptureMethod property contains a value that indicates that the Web capture is to be performed by the server platform 215, the "SERVER" branch is followed to step 415, where the server platform 215 returns the updated element to the browser application program. The browser application program then renders the updated captured element in the Web part at 425.

Returning to 410, if the CaptureMethod property associated with the captured element contains a second value that identifies that the Web Capture program 205 on the client platform 210 fetches the target Web page, the "CLIENT" branch is followed to routine 420 where the client platform 210 returns the updated captured element to the browser application program. At 425, the updated captured element is rendered in a Web part on the user's web portal.

Referring again to 410, if the determination is made that the captured element should be rendered within an IFRAME, then the "IFRAME" branch is followed to 430. The Web Capture routine 300 automatically determines whether the captured element should be rendered in an IFRAME by examining the properties associated with the element. First, if the captured element is the body of the target Web page, then the entire target Web page is rendered within an IFRAME and all other selections from the target web page are ignored. Secondly, if the ContentLink attribute on the property sheet contains a URL that starts with "http://" and the RenderTags attribute contains the value "Page" then the entire target Web page is displayed in an IFRAME. Lastly, if the ContentLink attribute contains a URL that starts with "http://" and either the RenderTags attribute contains a null value or the RenderTagsIndex attribute contains a null value, then the entire target Web page is rendered within an IFRAME.

At 430 HTML code is generated to perform the IFRAME capture. At 435, the server 215 again generates HTML code to download the Web Part page to the client platform 210. At 440, the browser application program extracts the URL associated with the target Web page and loads the URL into the IFRAME. Finally, at 445, the browser application displays the IFRAME in the Web part.

Figure 5A:
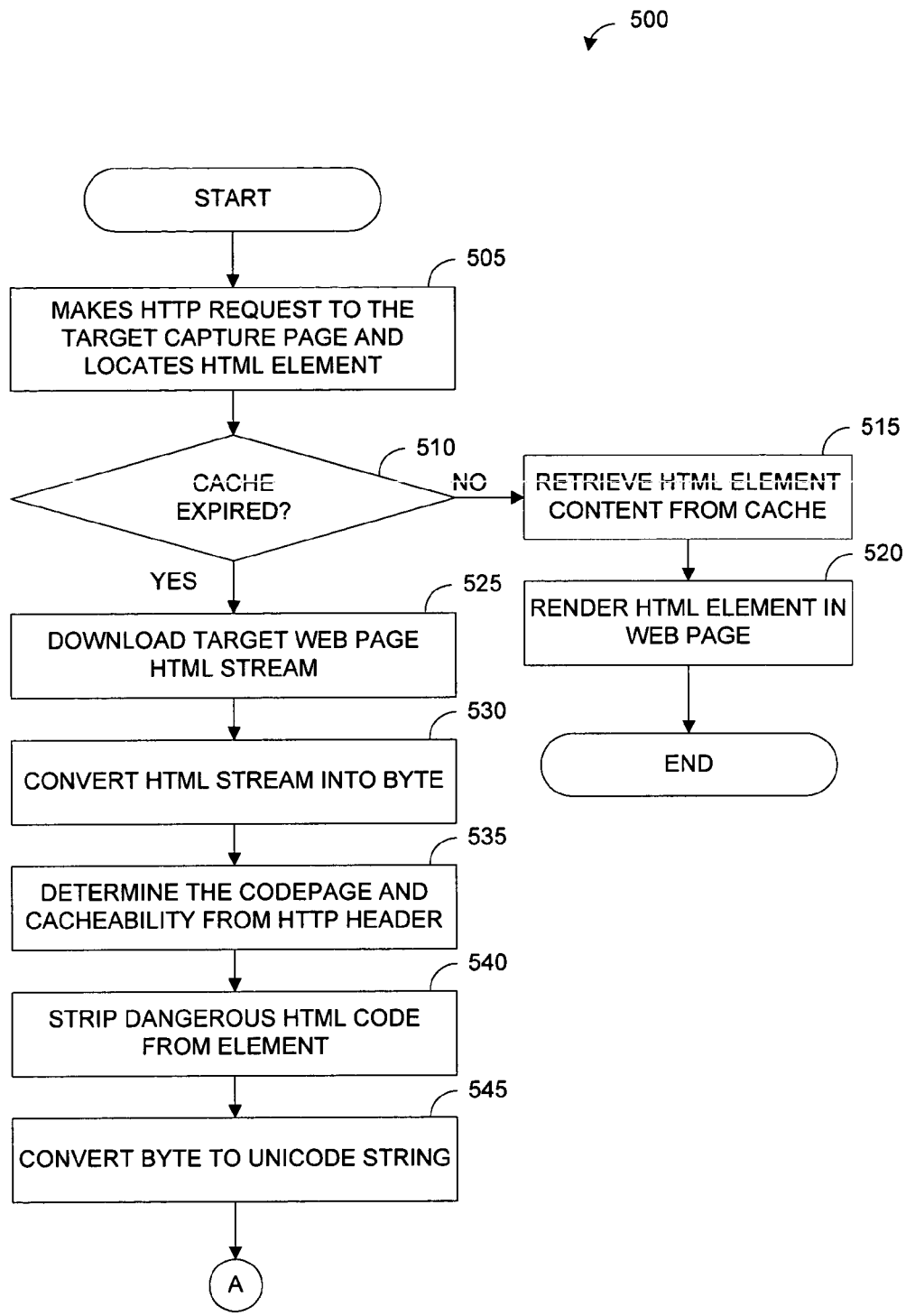
FIGS. 5A and 5B, collectively known as FIG. 5, are logic flow diagrams illustrating a routine for capturing content from a target Web page from a server platform.
Figure 5B:
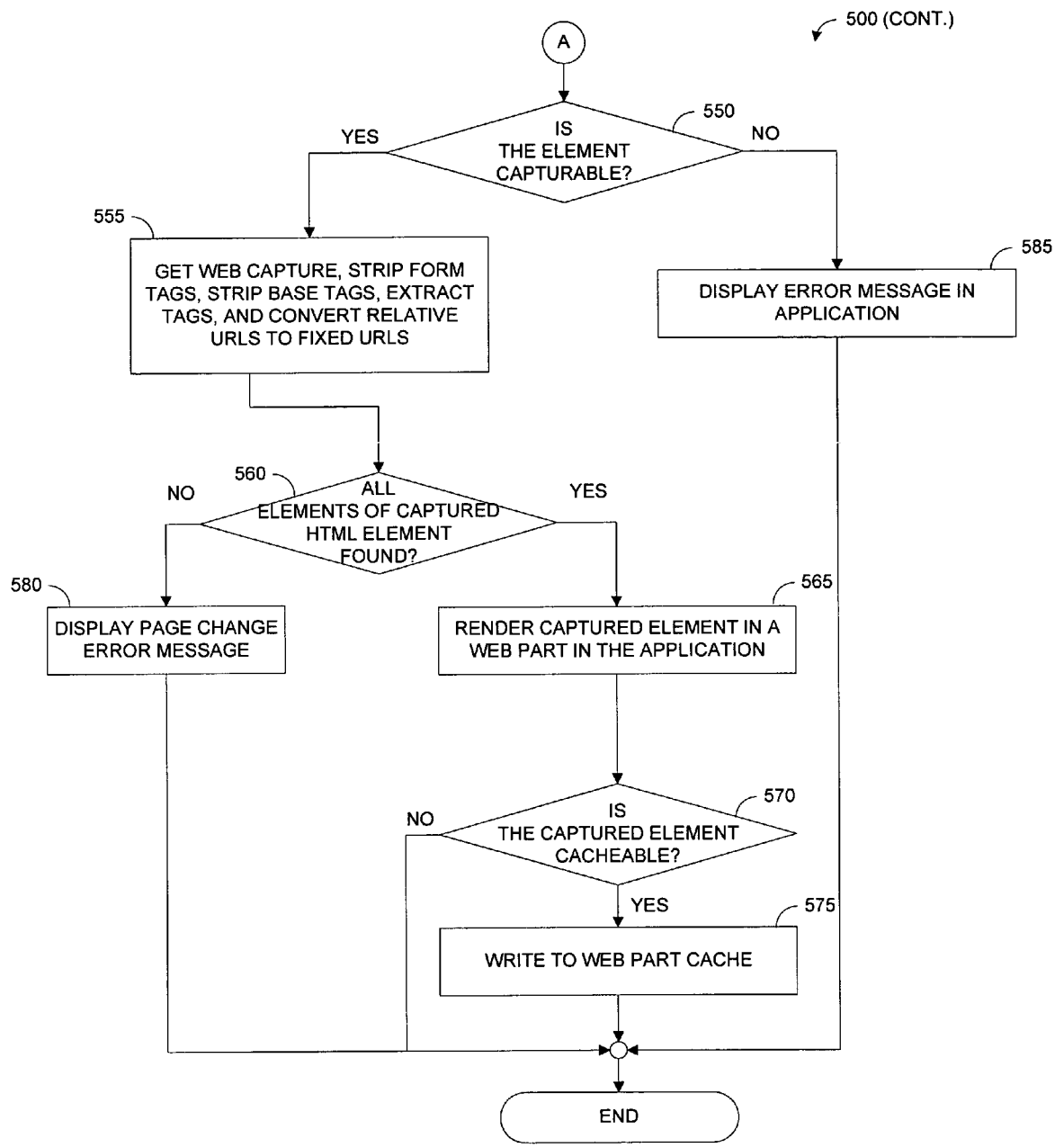

FIGS. 5A and 5B, collectively known as FIG. 5, are logic flow diagrams illustrating routine 500 from 415 in FIG. 4 where the server platform 215 retrieves the captured element from the target Web page and then processes the captured element so it can be rendered in the Web part in the browser application program.

Routine 500 begins at 505, where the Web Capture routine 300 makes an HTTP request to the target Web page to retrieve the captured object using the URL stored in the CaptureLink property. The target Web page returns the captured element in an HTML string. Next at 510, the determination is made whether the captured element previously stored in the cache memory on the server platform has expired. Each time a captured element is stored in the cache memory, a LastUpdate attribute is updated with the time and date that the captured element was updated. Another attribute associated with the captured element is the RefreshInterval. The RefreshInterval attribute contains an integer value that represents the amount of time that should elapse before the captured element is updated. The value stored by the RefreshInterval has a minimum allowable value of 1 minute and a maximum allowable value of 2,134,483,647 minutes. However, the default value for the RefreshInterval is set at 20 minutes. If the sum of the LastUpdate attribute and the RefreshInterval attribute is less than the current time stamp on the server platform 215, then the captured element does not need to be updated and the HTML string stored in the cache is still valid and the "NO" branch is followed to 515.

At 515, the HTML string is retrieved from the cache memory on the server. At 520, the server renders the captured element in the Web part and uploads the Web Part page to the user's browser application program. However, if the sum of the values in the LastUpdate and RefreshInterval attributes is less than the current time on the server platform, the determination is made at 510 that the HTML string in the cache memory has expired. In this instance the "YES" branch is followed to 525, where the Web Capture routine 300 retrieves the URL for the target Web page and the Tags and Tag Indexes for the captured element from the property sheet 225 on server platform 215. The Web Capture routine 300 generates an HTTP request to the target Web page. The target Web page returns the HTML string for the captured element to the server platform 215.

At 530, the HTML string is converted to a Byte array. Converting the HTML string to a Byte array allows the Web Capture routine 300 to index individual bytes, which makes it easier to identify the appropriate element from the target Web page. This provides a more efficient method for removing the content to capture than merely searching the HTML string.

At 535, the value stored in a CodePage attribute in the HTML header is examined. The CodePage attribute is used to determine whether the text of the captured element must be converted to the appropriate language before it is displayed in the Web part. This insures that if an element is captured from a Web site that uses foreign characters to display text, the captured element will be displayed using the characters common to the Web Part. For example, suppose that the user's Web page is displayed using English characters, while the target Web Page is from a Japanese Web site, which uses Japanese characters to display text. When an element from the Japanese Web site is captured, the CodePage attribute is examined to determine whether the element uses Japanese characters. If the value of the CodePage attribute indicates that Japanese characters are used to display the text, then the text of the element must be translated before it is rendered in the Web Page. Therefore, the CodePage attribute is used to determine whether the any text associated with the element needs to be translated before it can be rendered on the user's Web Part page.

Additionally, there may be some instances where the designer of the target Web page may not want to allow the element of their Web page to be stored on another server. In these instances, the designer may set a NoCache attribute to the appropriate value to prohibit another server storing the elements of the Web site. Therefore, the HTML string is examined to determine whether the NoCache attribute for the target Web page is set.

Next, at 540, Web Capture routine 300 examines the Byte array for "dangerous" code. If the determination is made that "dangerous" code is present, the Web Capture routine 300 removes it from the HTML string. An example of removing dangerous code from a Byte array is described in U.S. patent application Ser. No. 10/305,544, entitled "Method, System, and Computer-Readable Medium for Filtering Harmful HTML in an Electronic Document," filed on Nov. 27, 2002, and hereby incorporated by references. Typically, "dangerous" code is defined as an object, an applet, or script in which an executable program, such as a virus, may be inserted. Therefore, all applets, objects, and scripts not associated with the captured elements are removed. The remaining data in the Byte array is then considered "safe" to render in the Web part.

At 545, the remaining data in the Byte array is converted to a Unicode string. At 550 the determination is made whether the captured element in the target Web page can be captured. There are two situations where the elements may not be captured. First, the element may be too large to capture. To maintain efficiency and speed, the element must be less than a predetermined size. For example, if the element is greater than the predetermined size, too many resources will be used to download the element, which will decrease the efficiency of the system. Therefore, the size of element must be limited to insure efficient capture. In the exemplary embodiment, the predefined limit is set at one megabyte (1 Mbyte). Thus, if any individual element selected to be captured is greater than two megabytes, it will be prohibited from being captured and the "NO" branch is followed to 585, where an error message is displayed in the Web part informing the user that the element size has been exceeded.

Second, there may be instances when the designer of the target Web page does not want any element from the target Web page to be displayed in another Web site. In these instances, the designer may set one or more META tags to prohibit the capturing of either individual elements or the entire target Web page. Therefore, after the target Web page is downloaded, it is examined to determine whether the designer of the target Web page prohibited the capturing of any elements. Specifically, the returned HTML string from the target Web page is searched for the following string: <META MSAllowCapture="False">. If META tag MSAllowCapture is set to "False" then the designer has prohibited the capturing of the target Web page and the individual elements cannot be captured. Therefore, the "NO" branch is followed to 585 where an error message is displayed identifying that the elements cannot be displayed. If the META tag MSAllowCapture is not set to "False," then each element in the returned HTML string is searched to determine whether any element contains the MSAllowCapture attribute, which is set to "False." If any element on the target Web page contains the attribute MSAllowCapture="False" then the element cannot be captured and the "NO" branch is followed to 580, in which an error message is displayed in the Web part indicating that the elements cannot be captured. If however, neither the target Web page nor any element is marked to prevent capture, the element may be captured and the "YES" branch is followed to 555, where the captured element is retrieved. The form tags and base tags are then removed from the captured element. The form tags are removed from the element because they place page breaks in Web page. The base tags associated with the captured element are removed because they cause relative links to refer to a different server than what they are intended to refer to after an element is captured. Furthermore, all of the relative URLs in the captured element are then converted to absolute URLs. Additionally, the element IDs associated with the captured element are stripped. The element IDs are unique to each element so that if the Web part expects a particular element ID associated with the captured element to be associated with a different element currently in the Web part, the expectation of the element ID may cause an error to occur when the Web part is rendered. Therefore, since the element IDs are not critical to the appearance of the page, they are removed before the captured element is rendered in the Web part. Next, at 560 the determination is made whether all of the elements are present in the HTML string. If all of the elements are present in the HTML string, the "YES" branch is followed to 565, in which the captured elements are rendered in the Web part in the browser application program.

After the capture element is rendered in the Web part, the determination is made at 570 whether the captured elements from the target Web page can be stored to the cache memory on the server platform. The Web page designer may want to prohibit another user from storing the target Web page on a different server and set the HTML attribute NoCache on the target Web page. If the HTML string returned by the target Web page does not contain the NoCache attribute, then the target Web page can be stored and the "YES" branch is followed to 575 where the HTML string containing the captured element is stored in a cache memory on the server platform. However is the returned HTML string contains the NoCache attribute, then the captured element cannot be stored in the cache memory and the "NO" branch is followed to the "END" statement.

Figure 6A:
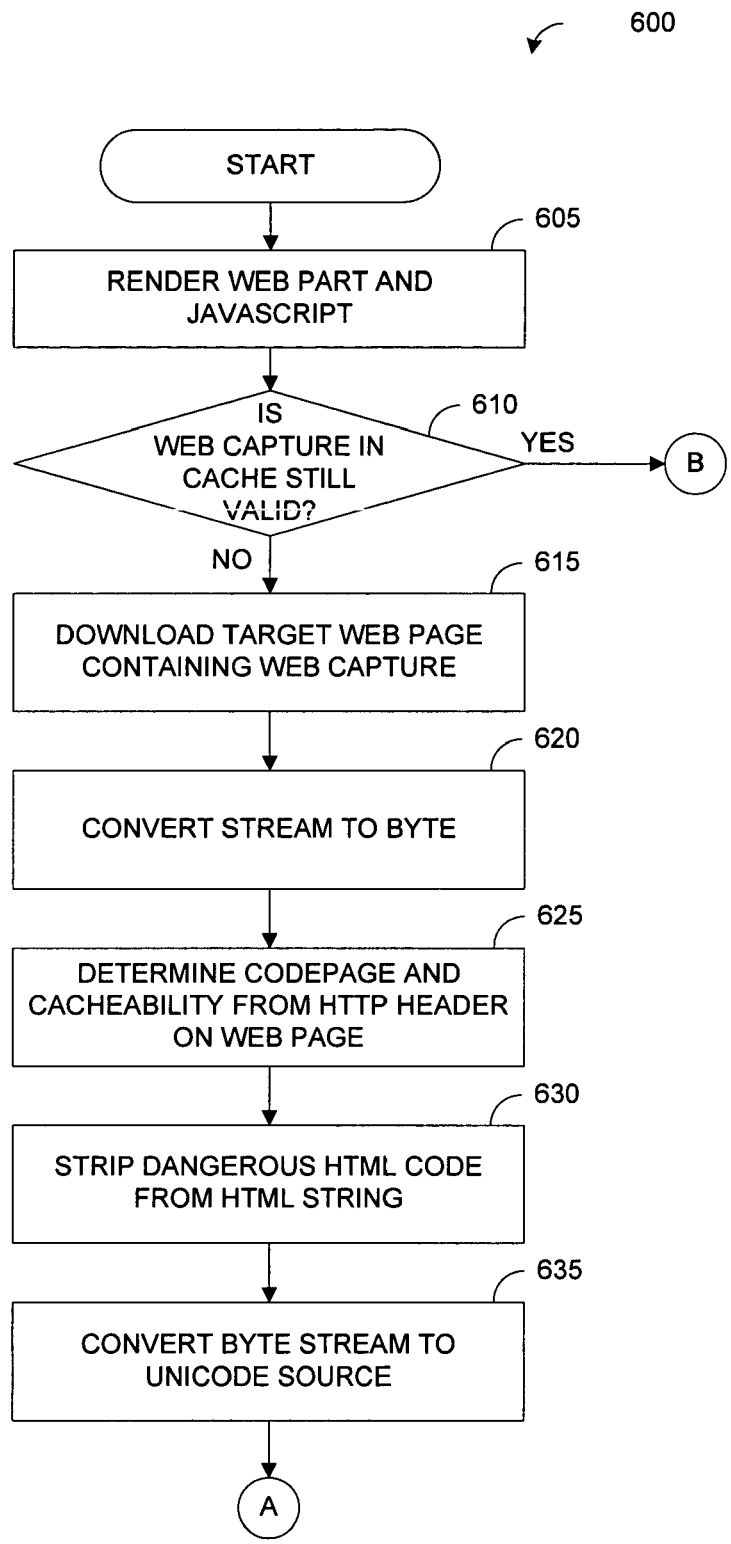
FIGS. 6A and 6B, collectively known as FIG. 6, are logic flow diagrams illustrating a routine for capturing content from a target Web page from a client platform.
Figure 6B:
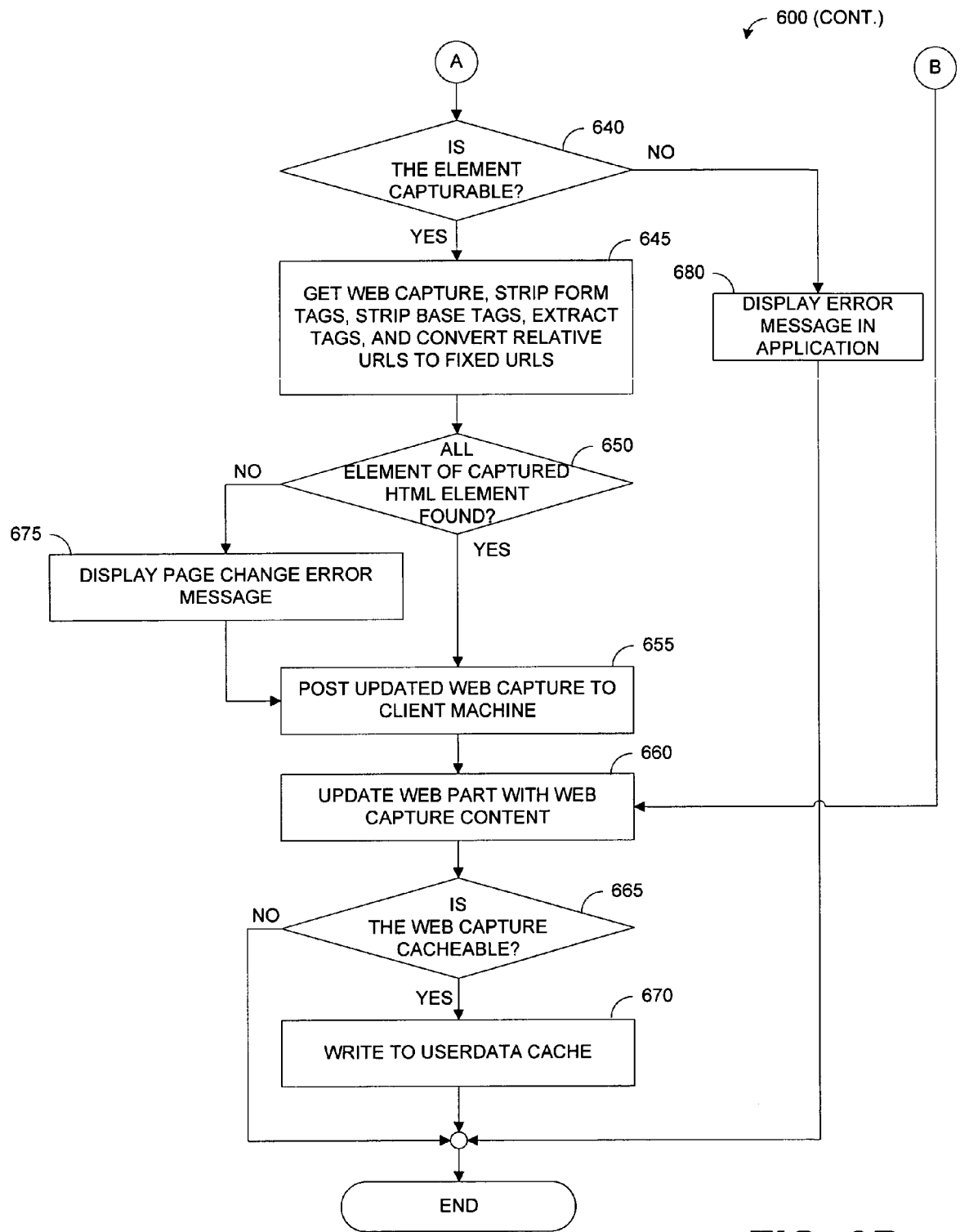

FIGS. 6A and 6B, collective known as FIG. 6, are logic flow diagrams illustrating a routine 600 from 420 of FIG. 4, for capturing elements from a target Web page by the client platform. Routine 600 begins at 605, when the Web Capture routine 300 on the client platform opens a Web part in the user's browser application program and runs a Jscript routine to download the target Web page to the client machine. At 610, the determination is made whether the captured element stored in a memory location on the client platform is current. Specifically, the sum of the values stored in the LastUpdate and RefreshInterval attributes associated with the captured element are examined. If the sum of the LastUpdate+RefreshInterval values are less than the current time on the client platform, the captured element is current in the cache memory and the "YES" branch is followed to 660. At 660, the captured element is rendered in the Web part in the browser application program and the value of LastUpdate attribute is updated with the current time and date stamp from the client platform.

Next, the determination is made at 665 whether the captured element can be stored in the cache memory. Since the captured element was not updated by downloading the target Web page, the NoCache attribute could not have been changed. Therefore, the captured element is automatically written to the cache memory at 670.

Returning to 610, if the sum of the LastUpdate+RefreshInterval values is greater than the current time on the client platforms internal clock, the captured element is outdated and the needs to be updated before it can be displayed in the Web part. Therefore, the "NO" branch is followed to 615, in which the Web Capture routine 300 executes the GetWebPage routine to retrieve the target Web page from the target server. This GetWebPage method is the same method used by the server platform to retrieve the target Web page and has the same variable. However, the GetWebPage routine is written in Jscript on the client platform. The target server returns the target Web page in an HTML string to the client platform. The client platform then forwards the HTML string to the Capture application on the server platform. The Capture application on the server platform performs the processing on the target Web page once the client platform retrieves the target Web page from the target server.

Steps 620, 625, 630, 635, 640, 645, and 650 are identical to steps 530, 535, 540, 545, 550, 555, and 560 described in FIG. 5 above. Therefore, the discussion of steps 620, 625, 630, 635, 640, 645, and 650 will not be repeated.

At 655, if all of the elements of the captured element have been found, the server platform 215 forwards the updated element to the Web part on the client platform 210. At 660, the Web Capture routine 300 on the client platform replaces the captured element in the Web part with the updated element received from the server platform 215. After the captured element rendered in the Web part has been updated the Web Capture routine 300 on the client platform 210 determines whether the updated element can be stored in the cache memory on the client platform by checking the HTML string of the updated captured element to determine whether the NoCache attribute was set at 665. If the NoCache attribute is not set, then the "YES" branch is followed to 670 where the captured element stored in the cache memory on the client platform 210.

Figure 7:
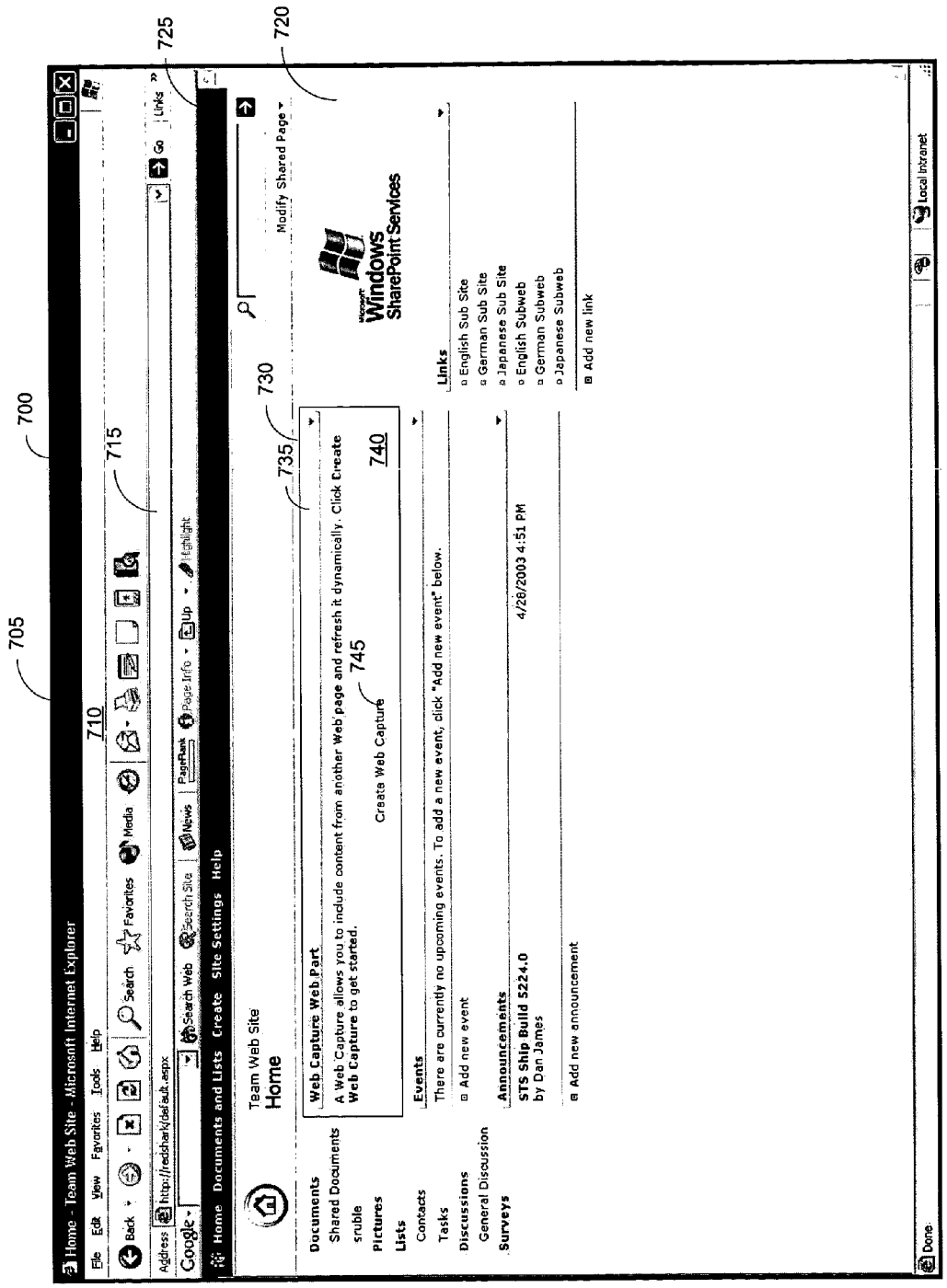
FIG. 7 is an illustration of a screen shot identifying a Web Part page with the Web Capture feature displayed in a browser application program.

FIGS. 7-12 are screen shots illustrating an example of capturing an element in accordance with the present invention. FIG. 7 illustrates an exemplary screen shot of a window 700 displaying a browser application program on a server platform. The browser window 700 contains a title bar 705, menu bar 710, an address bar 715, and a display pane 720. Within the display pane 720 is a Web page entitle "Team Web Site HOME," which contains a Web Capture Web part panel 730. The Web Capture Web Part panel 730 contains a title bar 735, and a display area 740. Whenever a Web part panel 730 is displayed on the Web page and the Web Part panel 730 is not populated, a default message explaining the Web Capture feature is displayed in a message area 742 in the display area 740. For example, in the figure the message "A Web Capture allows you to include content from another Web page and refresh it dynamically. Click Create Web Capture to get started." A link entitled "Create Web Capture" 745 is also displayed in the display area 740.

Figure 8:
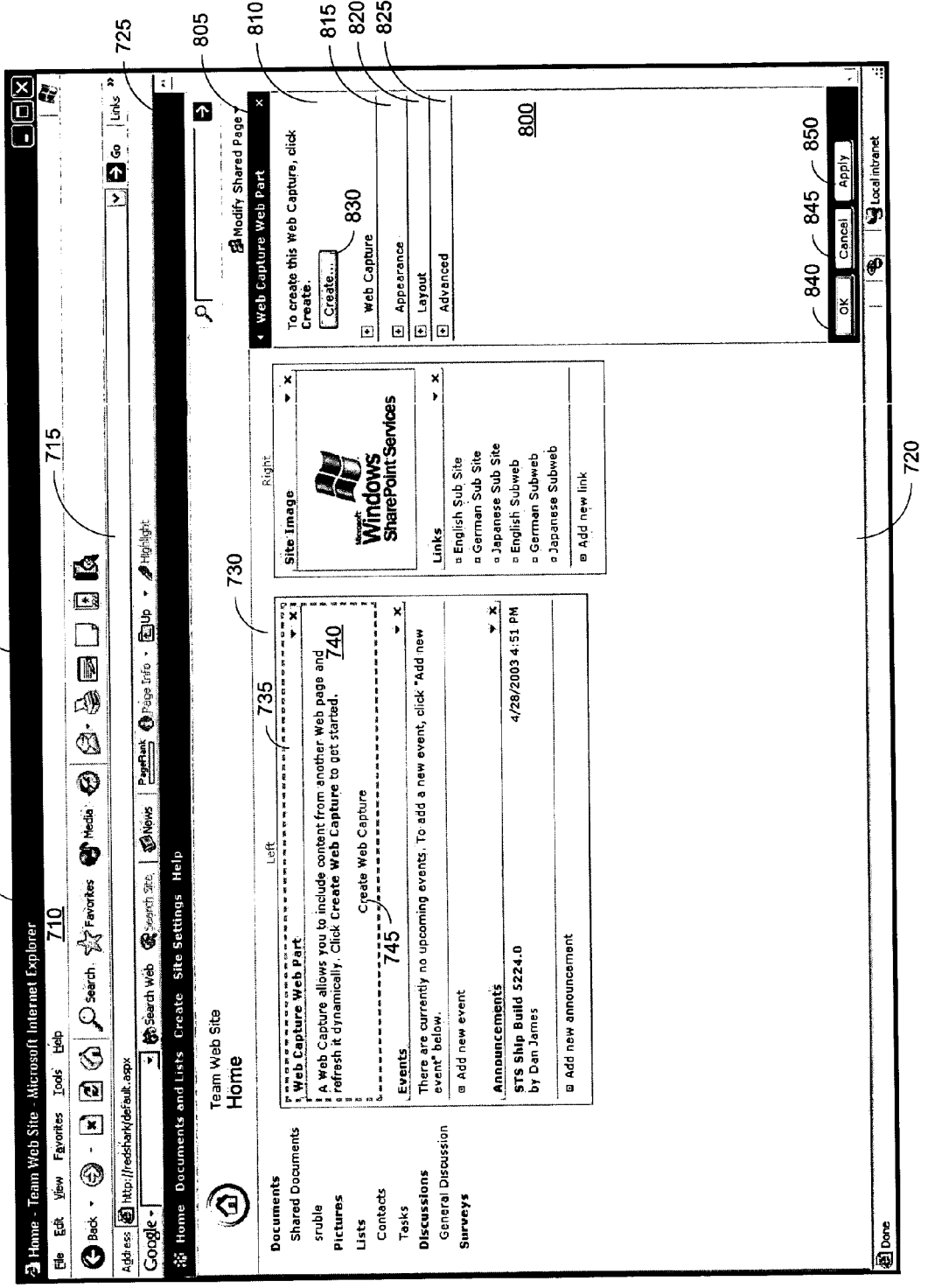
FIG. 8 is an illustration of a screen shot identifying a Web Part page after invoking the Web Capture feature in accordance with the present invention.

To begin a Web capture, the user selects the "Create Web Capture" link 745 using a standard input device, such as a mouse, a keyboard, or any other input device. Upon selecting the "Create Web Capture" link 745, a Web Capture Web Part tool pane 800 appears in the display area 720 of the browser application window 700, as shown in FIG. 8. The Web Capture Web Part tool pane 800 contains a title bar 805, a "Web Capture" tool part 810, an "Appearance" tool part 815, a "Layout" tool part 820, and an "Advanced" tool part 825. Since the ContentLink property does not contain a value, a "Create" button 830 is displayed in the Web Capture tool 810. In addition, the Web Capture Web Part tool pane 800 contains an "OK" button 840, a "Cancel" button 845, and an "Apply" button 850, whose functions are well known.

Figure 9:
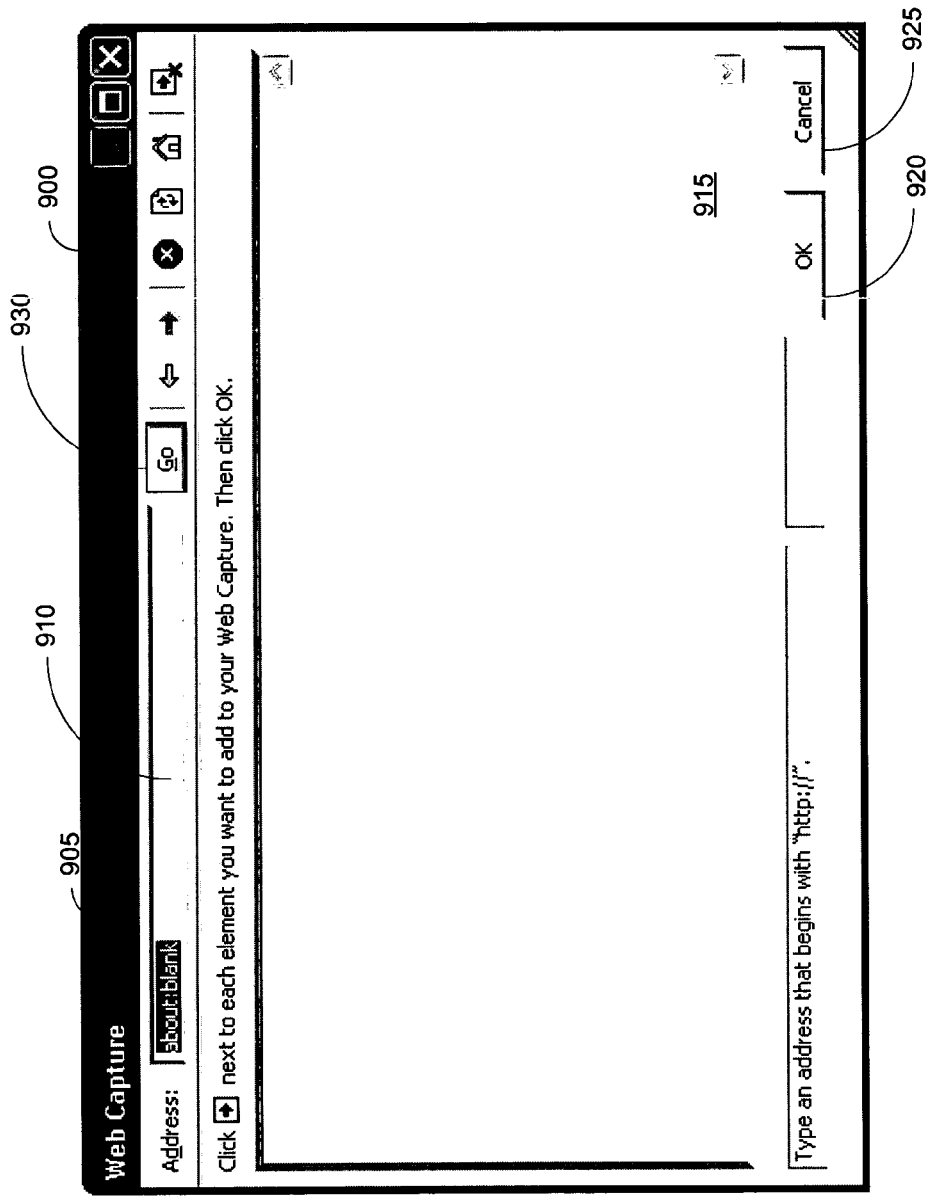
FIG. 9 is an illustration of a screen shot of a Web Capture dialog box in accordance with the invention.

When the user selects the Create button 830 in the Web Capture tool part 810, a Web Capture dialog box 900 is displayed as shown in FIG. 9. The Web Capture dialog box 900 contains a title bar 905, which contains the name of the dialog box. In the present invention, the title bar will always contain the title "Web Capture." The Web Capture dialog box 900 also contains an address bar 910, which also contains standard browser buttons, such as a "GO" button, a "Back" button, a "Stop" button, a "Refresh" button, a "Home" button and the like. The Web Capture dialog box 900 also has a display 915 for displaying the element the user may want to capture. Again, since the ContentLink property is empty, the display area 915 is blank. The Web Capture dialog box 900 also contains an "OK" button 920, which is used to accept the element to capture and a "Cancel" button 925, which is used to close the Web Capture dialog box 900 without capturing any elements.

Figure 10:
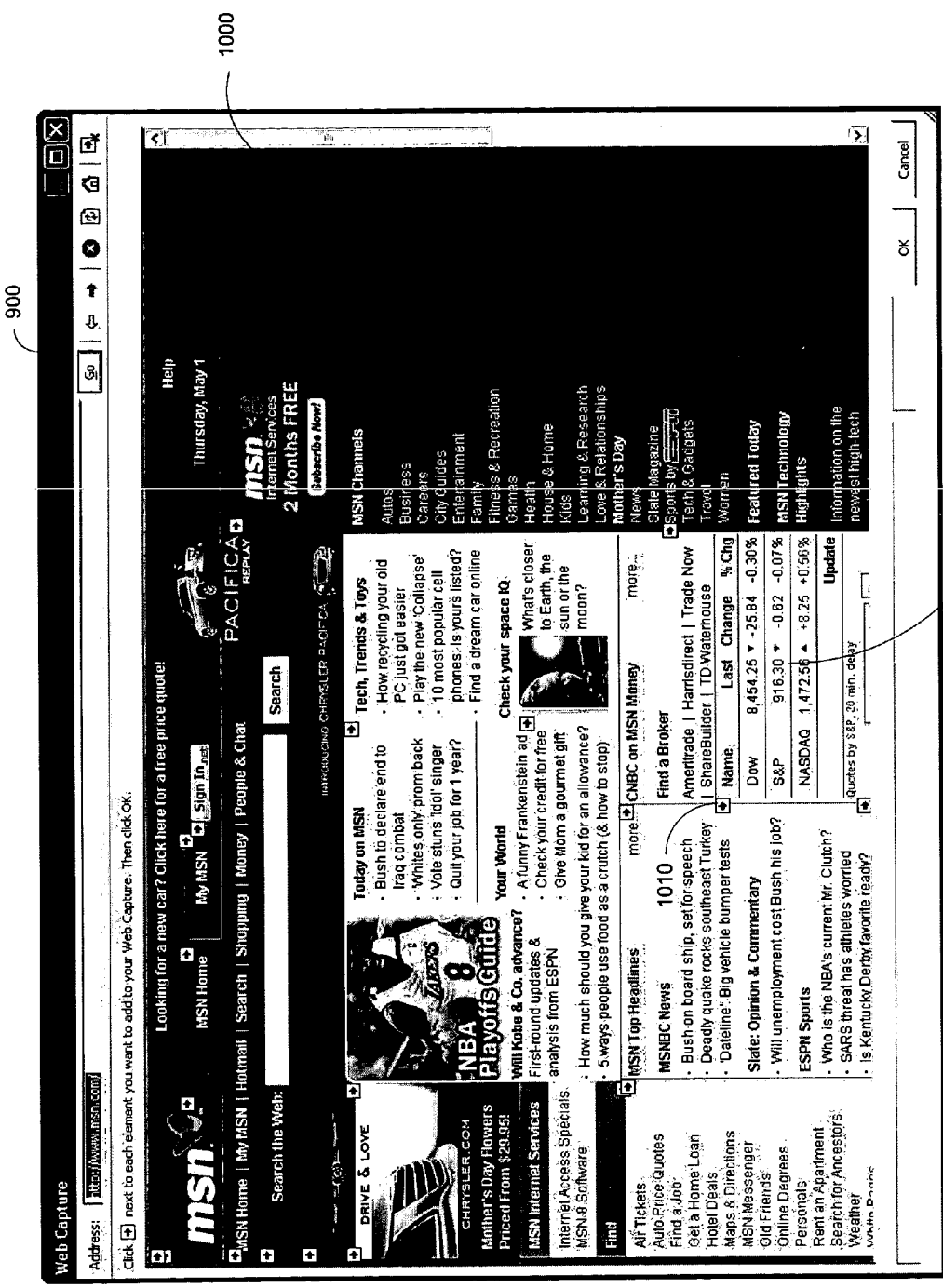
FIG. 10 is an illustration of a screen shot of a target Web page displayed within the Web Capture dialog box.

To navigate to the target Web page, the user places the cursor in the address window 910 and enters a valid URL for the target Web page. For example, if the user wanted to capture an element from the Microsoft Network home page, the user would enter the URL http://www.msn.com into the address window 910 and select the "GO" button 930. The result is that the Web page, www.msn.com 1000, is displayed in the display area 915 of the Web Capture dialog box 900, as shown in FIG. 10. Once the target Web page is loaded into the Web Capture dialog box 900, each element is examined and an icon is assigned to each element that is supported. Specifically, the HTML tags associated with each item are compared to a list of supported tags. For example, in the present invention only TABLE, IMG, BODY, and Web Part DIV tags are supported. For each of these tags, an icon is display proximate to the top left corner of the corresponding element. For example, table 1005 has the associated icon 1010, is displayed proximate to the upper left corner of table 1005. The icons give the user something tangible to click on to select or deselect a specific element for capture. The shape of the icon may be any shape that conveys to the user the current state of the element. For example, in the present invention, there are four icon shapes to convey the state of each element. The first icon is a regular right pointing arrow, which indicates that the element is available for selection. The second icon is a mouse-over right pointing arrow, which is displayed when the cursor is passed over the element and is available for capture. The third icon is a check mark. When an element is selected for capture, the left pointing arrow will change to the check mark icon to provide a visual indicator to the user that the particular element is ready for capture. Finally, the last icon is an "X," which indicates that the element is not available for capture. This icon will appear proximate to each TABLE, IMG, BODY, or Web Part elements that have the MSAllowCapture attribute set to the value "False."

Additionally, each icon may have mouse-over text associated with it. Mouse-over text appears whenever the cursor is passed over a particular icon. For example when the cursor passes over an icon associated with a particular table element, a text box may appear with a message such as "Click to include this table." Similarly, if a table has been selected, passing the cursor over the check mark icon associated with the selected table may produce the following text "Click to exclude this table." The mouse-over text may also be used to indicate to the user whether the Web page or any particular element on the target Web page is prohibited from being captured. In the case where the target Web page has the <MSAllowCapture="False"> value, a message, such as "This page does not allow Web capturing" may be displayed when the cursor is positioned over the page icon.

Similarly, individual elements may have a MSAllowCapture attribute set to "False," which prohibits the individual element from being captured. In these instances, whenever the cursor is placed over the icon associated with a prohibited element, a message such as "This [element name] does not allow Web capturing." is displayed over the icon.

Figure 11:
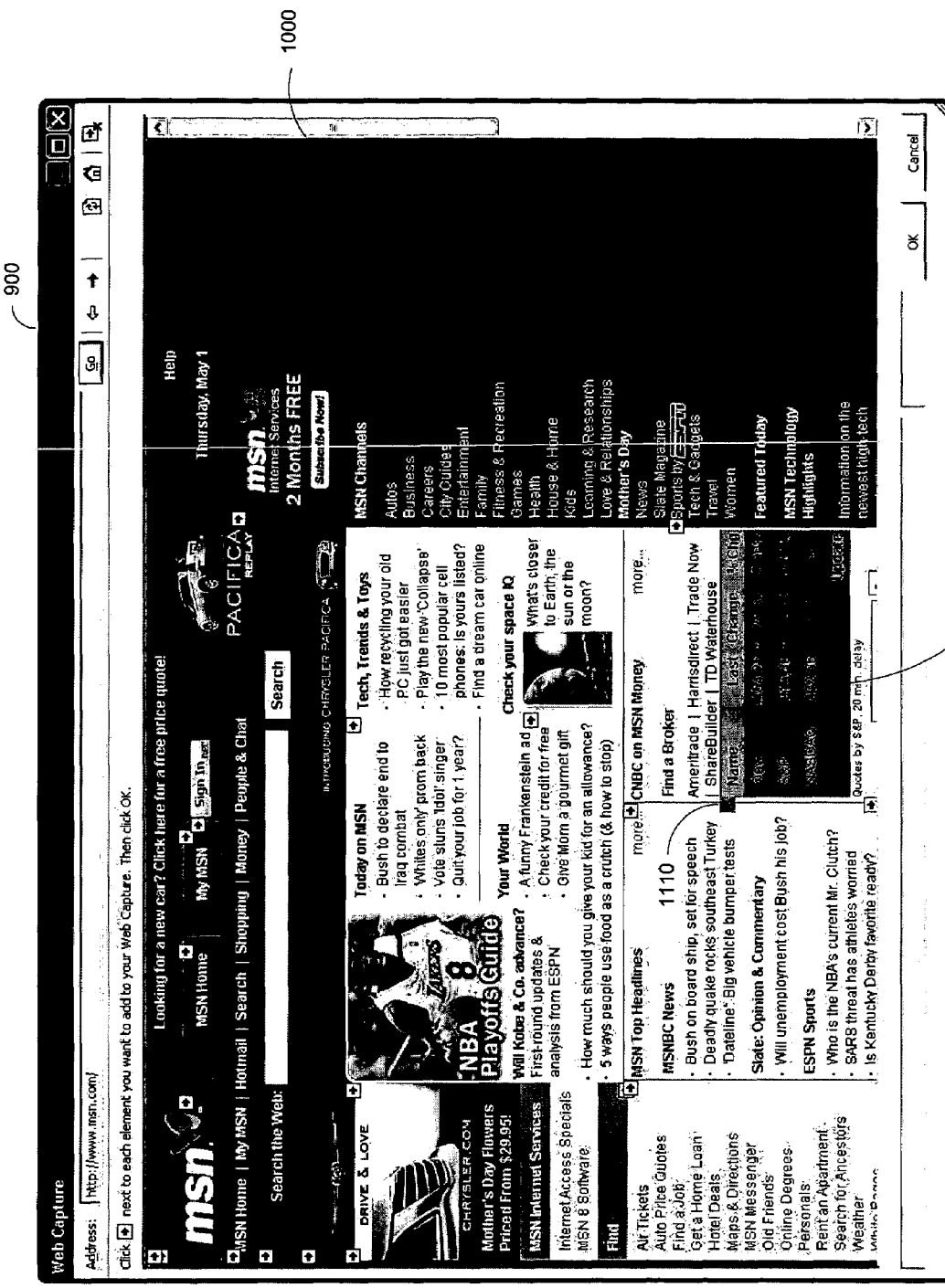
FIG. 11 is an illustration of a screen shot a target Web page with an element selected for capture.

When the user selects the table element 1005 to capture, by clicking on the associated icon 1010, the icon 1010 changes to a check mark 1110 and the table element 1005 is highlighted as shown in FIG. 11. When the user is finished selecting the element(s) he or she wants to capture, the user selects the "OK" button 920. The capture-specific properties are saved to the server platform 215. Specifically, the several base Web part properties associated with the captured elements are written to the Edit Tool Part 220 and the property sheet 225. These base Web part properties include the CategoryAttribute property, which contains the value "Web Capture" which indicates that all of the Web part properties will be grouped under the category heading "Web Capture" in the property sheet. Additionally, the base Web part properties include the DetailLink, Direction, and Title properties. The DetailLink property is set to the URL of the target Web page, the Direction property contains a value that is based on the target Web page that the URL is pointing to, and the Title property contains the title of the target Web page.

In addition to the base Web part properties, a series of capture-based properties for each element captured from the target Web page are stored in the property sheet 225. The capture-specific properties include the CaptureMethod, ContentLink, RenderTags, RenderTagIndexes, RefreshInterval, and LastUpdated properties to property sheet 225. The ContentLink property is an HTML string that specifies the URL of the target Web page. The CaptureMethod property is an integer value, which identifies whether the target Web page is downloaded by the client platform or the server platform. The RenderTags property stores a mask of the names of the tags associated with the elements that are captured and rendered in the Web part. The RenderTags property may take the values, TABLE, IMG, PAGE, or Web Part.

The RenderTagsIndex property stores a mask of the element ID of DOM indexes of the tags associated with the elements that are captured and rendered in the Web part. The Web Capture routine 300 will always try to store the element ID first, but most elements do not include IDs. When an element ID is not found with the element, the Web Capture routine 300 stores the DOM index. The mask is an array of element IDs or DOM indexes separated by commas. Although DOM indexes are zero-based, the Web Capture routine 300 stores the value (DOM index+1). Thus, if the user captured the second table on the target web page with a table ID="tlb2" and the tenth table in the HTML stream, which has a DOM index of 9, the RenderTagIndexes property would store the values RenderTagsIndexes="tbl2", 10. In the instance when two table may have the same element ID number, the Web Capture routine 300 will capture the only the first table.

The RefreshInterval property enables the captured elements to be stored in a cache memory for subsequent display in the browser application program. Storing the captured elements in a cache memory reduces the load on the processor by reducing the number of downloads of the captured elements from the target web page, and thus improves the time needed to load the captured elements. The RefreshInterval property stores an integer value with units in minutes between times the captured elements is required to update from the target Web page. The valid range of values for the RefreshInterval is 0 to about 2.1 billion. If the value is set to zero, the captured elements will not be refreshed by downloading the target Web page. Thus, the valid range of times for performing a refresh of the captured element is 1 to about 231 minutes. In the present invention, the default value of the RefreshInterval is set at 20 minutes.

The LastUpdated property contains a value equal to the time and date stamp of when the elements were updated. The Web Capture routine 300 updates replaces the value for the LastUpdate property with the time and date stamp from the platform (client, if the client platform performs the download, or the server if the server platform performs the download) at the time the user selected the "OK" button 920 on the Web Capture dialog box 900.

Figure 12:
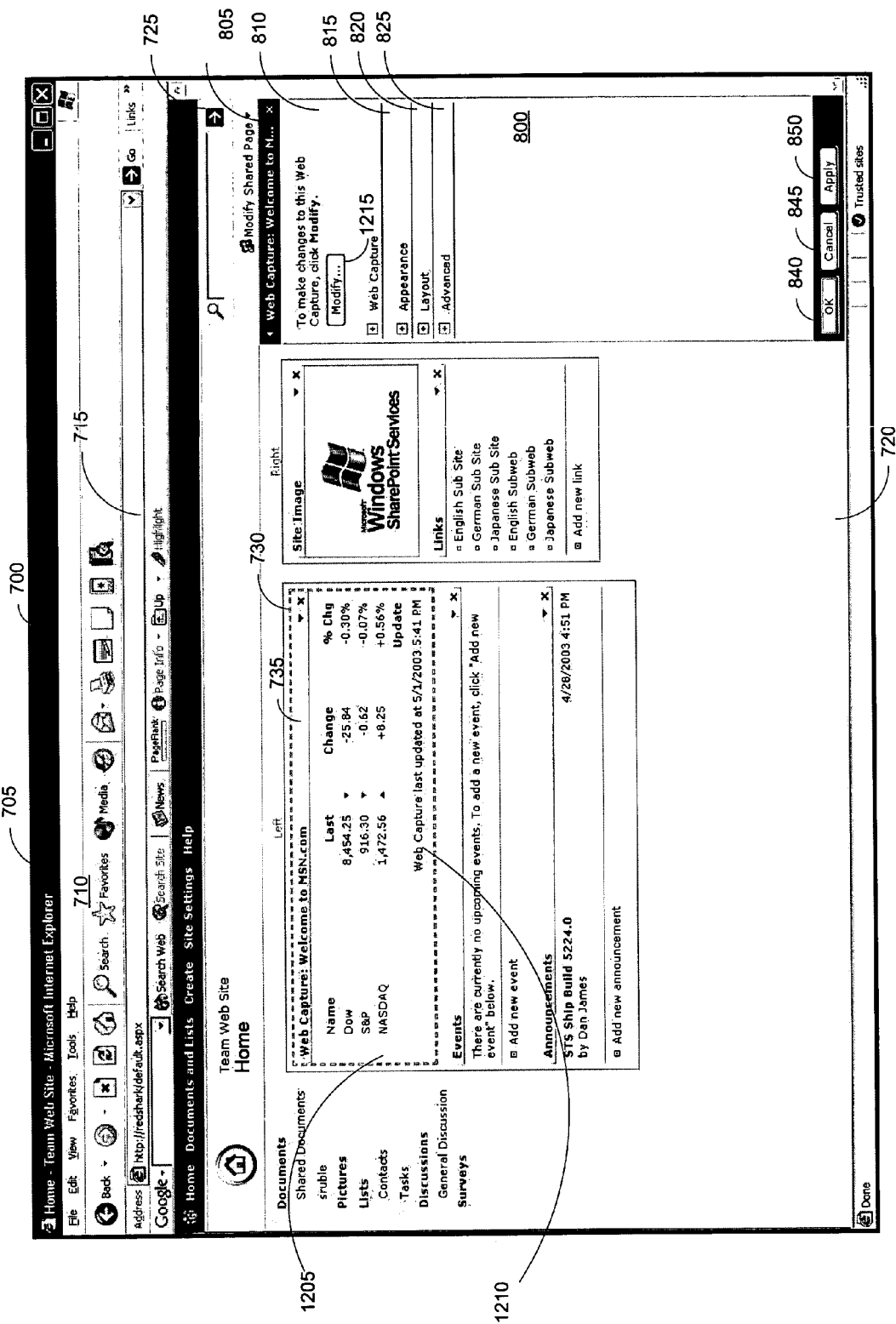
FIG. 12 is an illustration of a screen shot of the captured element displayed within a Web part.

Finally, FIG. 12 shows the result of capturing table 1105 and displaying it in the browser application program 700. The table 1105 is rendered in the display area 740 of the Web part panel 730. A message is also displayed in a message area 745 in the bottom portion of the Web part panel 730, which provides details when the last update of the table occurred.

Other alternative embodiments will become apparent to those skilled in the art to which an exemplary embodiment pertains without departing from its spirit and scope. Accordingly, the scope of the present invention is defined bye the appended claims rather than the foregoing description.

We claim:

1. A method for dynamically capturing an element from a target Web page comprising a plurality of elements and rendering the captured element in an application program, comprising:

displaying the target Web page in a dialog box;
determining whether each element supports being captured, wherein determining whether each element supports being captured comprises:
examining a string to identify tag information associated with each element; and
comparing the identified tag information to a predetermined set of values associated with the supported elements to determine whether the identified tag information matches one of the predetermined set of values;
placing an icon proximate to the each element that supports being captured, wherein the icon is utilized to convey that an element is available for capture or selection;
placing a second icon proximate to the each element that does not support being captured, wherein the second icon is utilized to convey that an element is not available for capture and is different from the first icon, wherein the first icon and the second icon comprise a symbol selected from the group comprising an arrow, a check mark, and an X;

receiving and indication of selection of the element from the target Web page to capture;

determining, based on a status associated with the icon, whether the selected element supports being captured;

if the determination is made that the element supports being captured, then performing a sequence comprising:
  storing a link associated with the target Web page;
  retrieving a hypertext markup language (HTML) string from the target Web page for the captured element;
  storing the HTML string in a cache memory as a Web capture; and
  displaying the element in a Web part in the document in the application program, wherein the Web part comprises a panel displayed within the document; and if the determination is made that the element does not support being captured, then displaying an error message in the Web part in the document.

2. The method of claim 1 further comprising:
removing dangerous code from the HTML string before storing the string in a cache memory.

3. The method of claim 2, wherein removing dangerous code from the HTML string comprises:
  converting the HTML string to a byte array;
  removing objects that may contain executable programs from the byte array; and
  converting the byte array to a Unicode string.

4. The method of claim 1, wherein determining whether the object can be captured comprises:
  searching the HTML string to determine whether a first flag is set to a first value;
  searching the HTML string to determine whether a second flag associated with the target Web page is set to a second value;
  determining whether the element is greater than a predefined value.

5. The method of claim 1, further comprising determining whether the object will be rendered as an IFRAME in the Web part in the application program.

6. The method of claim 5, wherein determining whether the element will be rendered as an IFRAME, comprises rendering the object as an IFRAME within the Web page if the object comprises the body of the target Web page.

7. The method of claim 1, wherein saving the element in memory comprises:
  stripping the FORM tags from the HTML string;
  stripping the BASE tags from the HTML string;
  converting all relative (URLs) within the HTML string to absolute URLs;
  storing the HTML string in a cache memory; and
  storing a time and a date stamp identifying when the HTML string was stored in the cache memory.

8. The method of claim 1, further comprising:
  determining whether the element stored in the memory is current; and
  dynamically refreshing the element stored in the memory if the element is not current.

9. The method of claim 8, wherein refreshing the element in the cache memory comprises:

determining whether the element is captured by the server and, if the element is captured by the server, then performing a sequence comprising:
  opening the Web part in the application program;
  selecting the element to capture to the application program;
  determining whether the cache memory has expired;
  if the cache memory has not expired, performing a first sequence comprising:
    retrieving the element from the cache memory; and
    rendering the element in a Web part in the application program;
  if the cache memory has expired, performing a second sequence comprising:
    downloading a hypertext markup language (HTML) string comprising the target the Web page containing the element;
    determining whether the element supports being captured;
    if the object supports being captured displaying the object in a Web part in the application program;
    storing the element in the cache memory; and
    if the element does not support being captured,
displaying a first error message in the Web part in the application program.

10. The method of claim 9, further comprising:
determining whether the element is captured by the client; and
if the element is captured by the client, performing a sequence comprising:
  opening the Web part in the application program;
  determining whether the element is stored in a cache memory at the client;
  if the element is stored in the cache memory at the client, retrieving the element from the cache memory at the client and render the element in the Web part;
  if the element is not stored in the cache memory, performing a second sequence comprising:
    retrieving the target Web page; and
    sending a control message to the server to capture the element from the target Web page.

11. The method of claim 1, wherein determining whether each element supports being captured comprises:
  wherein the predetermined set of values comprise a TABLE, a WIG, a Body; and a DIV.

12. A computer system for dynamically capturing elements from a target Web page and displaying them in a second Web page, comprising:
  a client platform comprising:
    a processing unit; and
    a memory unit;
  a server platform, comprising:
    a second processing unit;
    a second cache memory unit; and
    a storage unit; and
  a Web capture routine operable to select, capture and dynamically display the captured elements in a Web part in the second Web page and automatically determining whether the captured elements are rendered by examining properties associated with the captured elements, the second Web page generated by an application program on the client platform, wherein the Web part comprises a dialog box, wherein the dialog box displays a panel displayed within the second Web page, and wherein at least a portion of the Web capture routine runs on the processing unit on the client platform, and at least a portion of the capture routine runs on the server platform, and wherein the Web capture routine places an icon proximate to each element that supports being captured, wherein the icon is utilized to convey that an element is available for capture or selection, and places a second icon proximate to each element that does not support being captured, wherein the second icon is utilized to convey that an element is not available for capture and is different from the first icon, wherein the first icon and the second icon comprise a symbol selected from the group comprising an arrow, a check mark, and an X.

13. The computer system of claim 12, wherein
the part of the Web capture routine running on the client platform
  fetches the target Web page;
  captures the elements from the target Web page and displays the captured elements on the second Web page; and
the part of the Web capture routine running on the server platform
  processes the captured elements; and
  stores the captured elements in the second cache memory.

14. The computer system of claim 12, wherein
the part of the Web capture routine running on the server platform
  fetches the target Web page;
  captures the elements from the target Web page; and
  processes the captured elements;
the part of the Web capture routine running on the client platform
  displays the captured elements on the second Web page; and
  stores the captured elements in the first cache memory.

15. The computer system of claim 12, wherein the fetched target Web page comprises a hypertext markup language (HTML) string.

16. The computer system of claim 15, wherein processing the captured elements comprises:
  removing active content from the HTML string;
  converting relative URLs to absolute URLs; and
  removing all content from the HTML string that is not used to render the captured elements.

17. The computer system of claim 14, wherein the fetched target Web page comprises a hypertext markup language (HTML) string.

18. The computer system of claim 17, wherein processing the captured elements comprises:
  removing active content from the HTML string;
  converting relative URLs to absolute URLs; and
  removing all content from the HTML string that is not used to render the captured elements.

19. The computer system of claim 12, further comprising storing properties associated with each captured element in the memory unit on the server platform.

20. The distributed computer system of claim 19, wherein the properties associated with the captured elements comprise:
  the URL of the target Web page;
  a date and time stamp of when the captured elements were displayed;
  a plurality of tags, wherein each tag identifies at least one captured element on the target Web;
  a plurality of indexes, wherein each index identifies the position of at least one captured element on the target Web page;
  a refresh interval which describes a minimum time interval before the captured elements are updated; and
  a capture method for determining whether the client platform or the server platform fetches the target Web page.

21. In a computer system having a graphical user interface including a display and a user interface selection device, a method of displaying and dynamically capturing an element from a target Web page, comprising:
  receiving a selection of an item from the display to open a Web Capture dialog box;
  displaying the Web Capture dialog box on the display;
  receiving a uniform resource locator (URL) associated with the target Web page, wherein the target Web page comprises a plurality of elements;
  displaying the target Web page within the Web Capture dialog box;
  examining one or more tags to determine whether capturing of each of the plurality elements is prohibited;
  if the capturing of an element of the plurality of elements is prohibited, placing an icon proximate to the element prohibited from being captured, wherein the icon is utilized to convey that an element is not available for capture;
  if the capturing of at least one element of the plurality of elements is not prohibited, placing a second icon proximate to the each element that supports being captured, wherein the second icon is utilized to convey that an element is available for capture or selection and is different from the first icon, wherein the first icon and the second icon comprise a symbol selected from the group comprising an arrow, a checkmark, and an X;
  receiving an indication selecting at least one element;
  dynamically capturing the selected element; and
  displaying the captured element in a Web part in the display, wherein the Web part comprises a panel within the display.

22. The computer system of claim 21, wherein capturing the element, comprises:
  storing the URL of the target Web page in a first memory device;
  storing a tag identifying the capture element in the first memory device;
  storing an index identifying a relative position of the capture element on the target Web page in the first memory device;
  storing a plurality of properties associated with the captured element in the first memory device; and
  storing the captured elements in a second memory device.

23. The system of claim 22, wherein the plurality of properties associated with the captured element comprise:
  a date and time stamp of when the captured elements were displayed; and
  a refresh interval which describes a minimum time interval before the captured elements are updated.

* * * * *

UNITED STATES PATENT AND TRADEMARK OFFICE
CERTIFICATE OF CORRECTION

| | | |
|---|---|---|
| PATENT NO. | : 7,325,188 B1 | Page 1 of 1 |
| APPLICATION NO. | : 10/654658 | |
| DATED | : January 29, 2008 | |
| INVENTOR(S) | : Clinton D. Covington et al. | |

It is certified that error appears in the above-identified patent and that said Letters Patent is hereby corrected as shown below:

In column 20, line 23, in Claim 21, after "plurality" insert -- of --.

Signed and Sealed this

Fifteenth Day of February, 2011

David J. Kappos
*Director of the United States Patent and Trademark Office*